June 2, 1959  H. HEIMBERGER ET AL  2,888,727
SLIDING CLASP FASTENERS
Filed Dec. 29, 1952  7 Sheets-Sheet 1
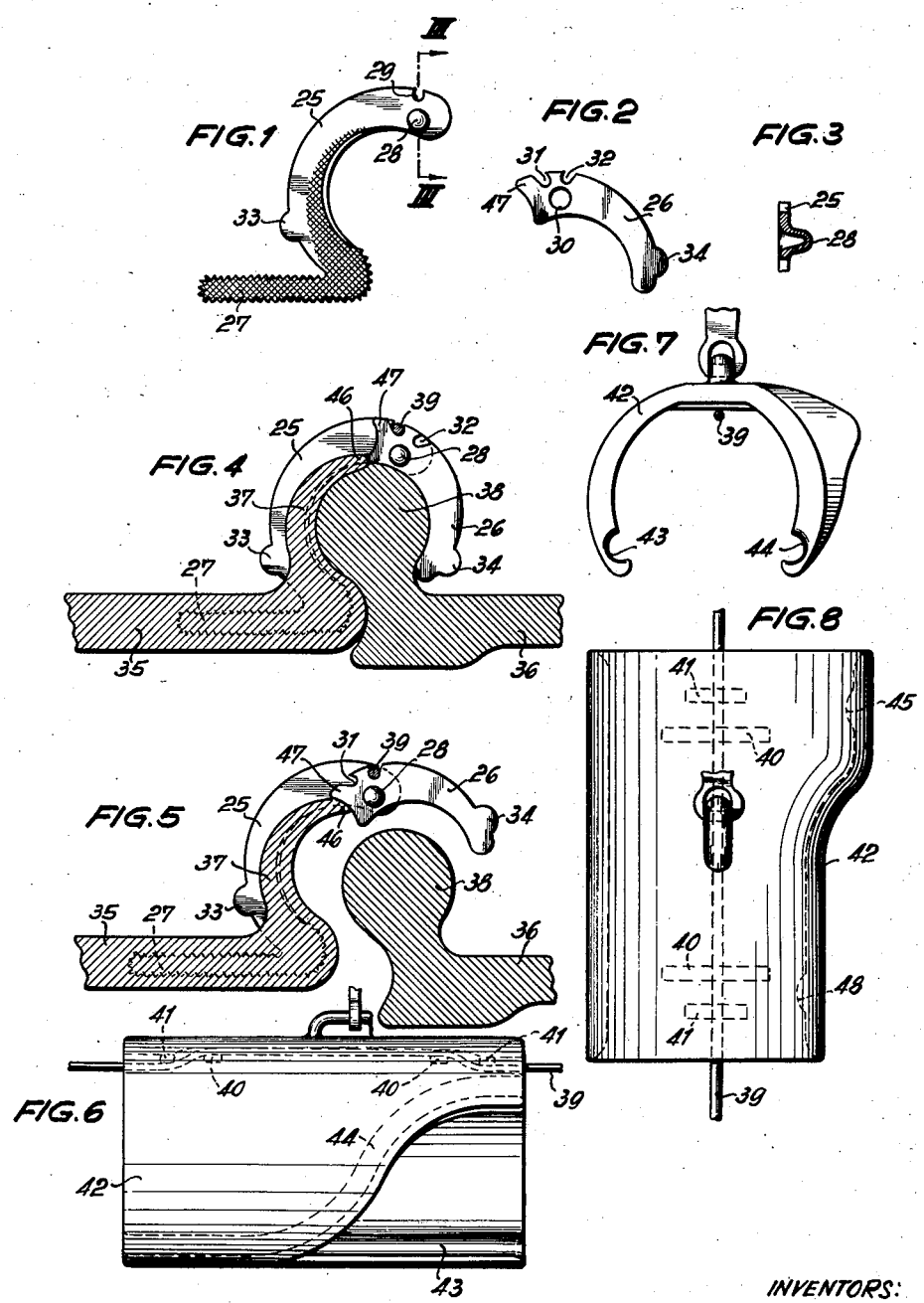
INVENTORS:
HELMUT HEIMBERGER
AND AUGUST BÜNGER
BY:

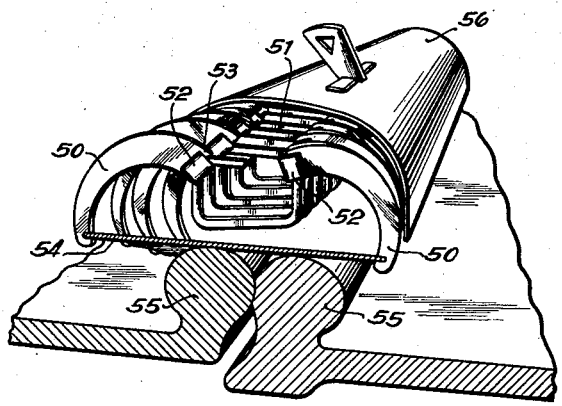
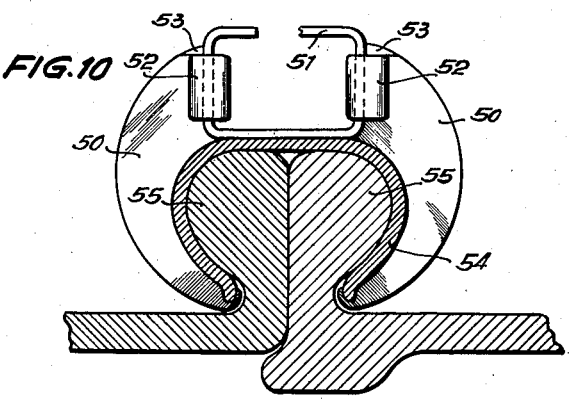
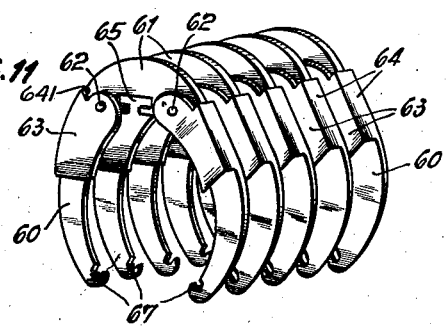

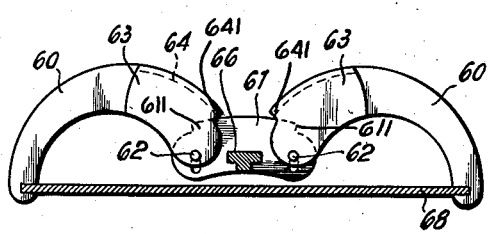
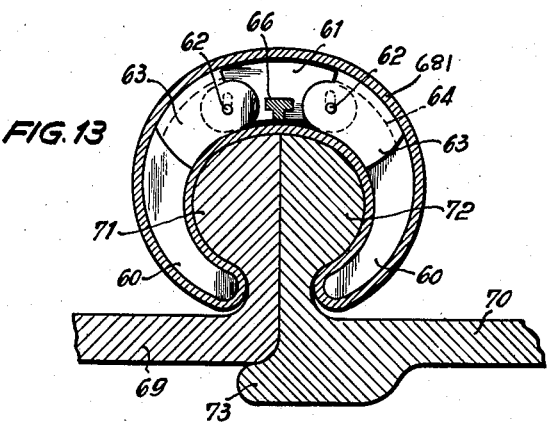
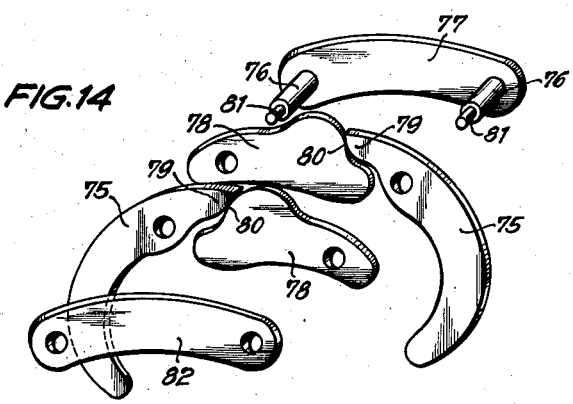

June 2, 1959  H. HEIMBERGER ET AL  2,888,727
SLIDING CLASP FASTENERS
Filed Dec. 29, 1952  7 Sheets-Sheet 4

INVENTORS:
HELMUT HEIMBERGER
AND AUGUST BÜNGER
BY:

June 2, 1959 H. HEIMBERGER ET AL 2,888,727
SLIDING CLASP FASTENERS
Filed Dec. 29, 1952 7 Sheets-Sheet 5
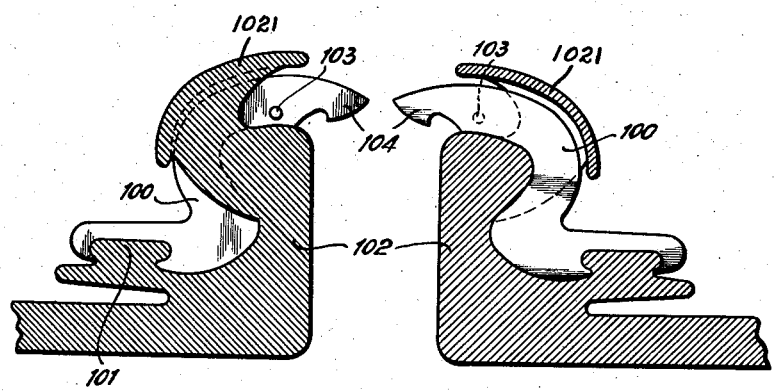
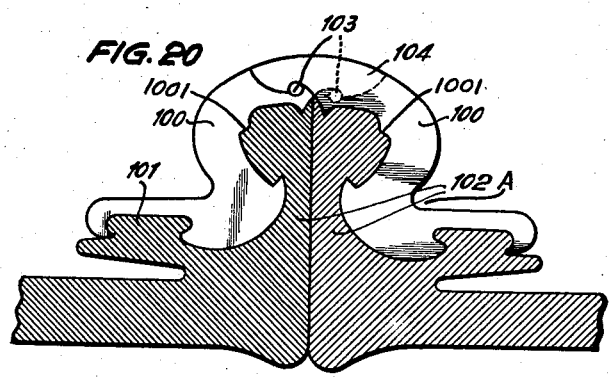
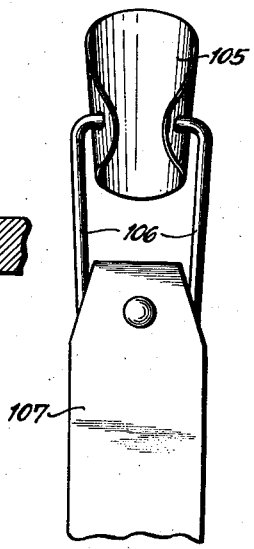
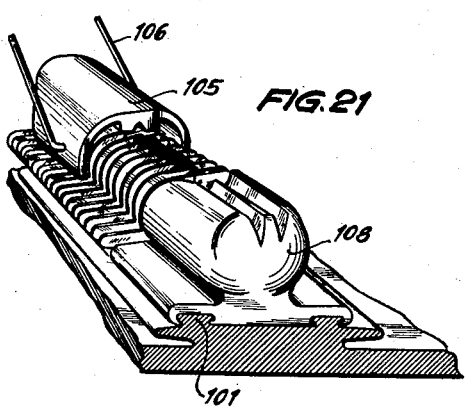
INVENTORS:
HELMUT HEIMBERGER
AND AUGUST BÜNGER
BY:

June 2, 1959     H. HEIMBERGER ET AL     2,888,727
SLIDING CLASP FASTENERS
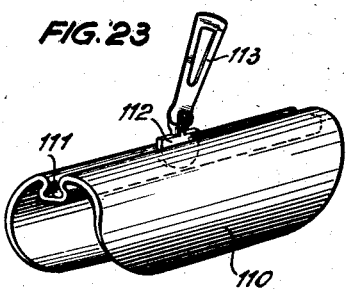
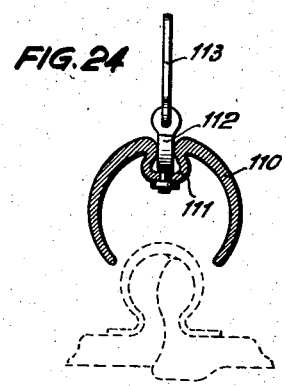
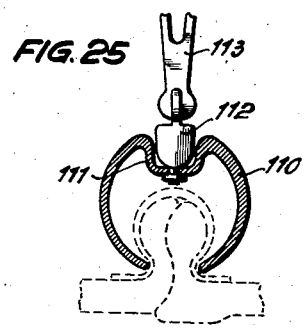
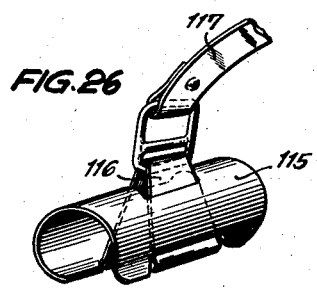
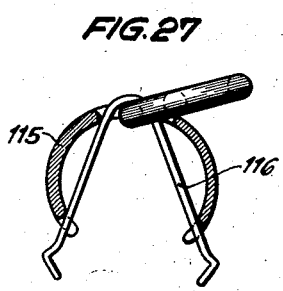
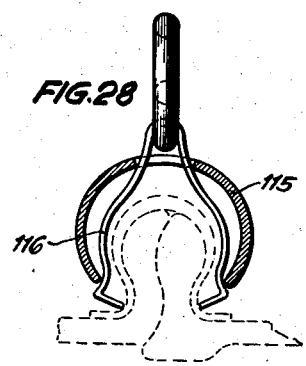
INVENTORS:
HELMUT HEIMBERGER
AND AUGUST BÜNGER.
BY:

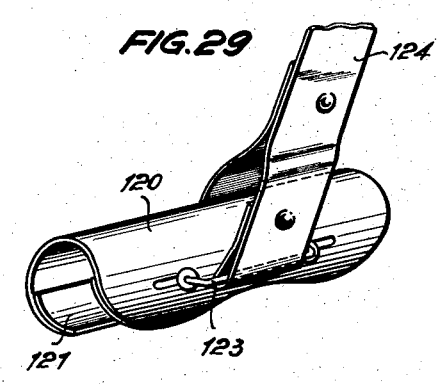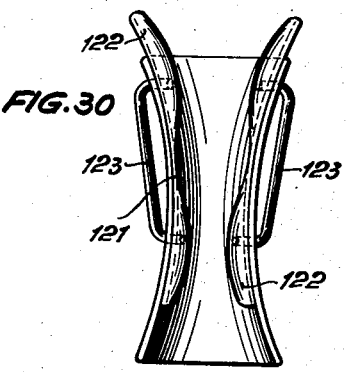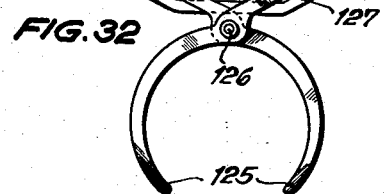

2,888,727
SLIDING CLASP FASTENERS

Helmut Heimberger, Coburg, and August Bünger,
Wuppertal-Barmen, Germany

Application December 29, 1952, Serial No. 328,364

Claims priority, application Germany December 29, 1951

26 Claims. (Cl. 24—205.1)

This invention relates to sliding clasp fasteners of the kind having members adapted to rock transversely to the longitudinal direction of the fastener, and particularly intended to produce tight connections which are retained even when high pressures are applied.

In air- or water-tight sliding clasp fasteners produced hitherto, projecting beads lying on both sides of the middle plane of the fastener and provided on the pieces of material to be joined together were pressed against one another by tensely stressed fastening members. The fastener members of these fasteners rock in the longitudinal plane of the fastener on opening and closing. This necessarily results in the dependence of the pressure, which produces the seal, between the mutually contacting edge parts of the pieces of material, on the tensile stress producing said pressure, since the tensile stress causes an elongation, determined by their size, of the members hooked together, thus leading to an elongation and hence to a reduction of the pressure between the sealing edges bearing against one another. This drawback can be only incompletely overcome by providing an elastic initial tension, since it is obviously not possible to select any desired magnitude for the dimensions of the fastener members, because the latter must be accommodated between the sealing edges of the pieces of material to be joined together. The attainable tightness with respect to elevated pressures is accordingly only relatively slight in proportion to the external cross-sectional dimensions of the fastener.

Fasteners have moreover already been disclosed in which the fastener members rock transversely to the longitudinal direction of the fastener during the opening and closing of the latter. With such fasteners, tightness in respect of the passage of air, water, or the like, has not been achieved, since the coupling parts of the members lie between the edge parts of the pieces of material to be joined together. However, fasteners of this type have also already been proposed in which only one of the pieces of material to be joined together is provided with members adapted to rock transversely to the longitudinal direction of the fastener, said members being intended to engage like hooks over a bead edge of the other piece of material. In such fasteners, however, adequate tightness cannot be achieved, because the hook-shaped members are only rocked over the bead in order to reach the closing position, and adequate sealing pressure cannot be achieved by that means. Such fasteners have therefore not attained any practical importance.

The invention has for an object the provision of a sliding clasp fastener which, in addition to the ability to take heavy forces, is also able to press tightly together the pieces of material to be joined, without thereby producing any substantial dependence of the tightness on the pressure to be withstood. To this end, the fastener members are so constructed that they engage like hooks over edge strips of the parts to be joined and in the engaged position can be tightened in relation to one another, being formed according to the invention by clamp arms which engage from opposite outer sides over oppositely situated edge strips projecting transversely to the surfaces of the parts to be connected and by means of a slide can be pressed against said edge strips, while they are locked to one another after the closing position has been reached. In contradistinction to the abovementioned previously known types of fastener, the hook-like fastener members engaging over the edge strips of the parts to be joined are composed of parts movable in relation to one another and in addition are so arranged that they are locked to one another in the respective desired tightened position. It is thus possible to select the pressure between the edge strips of the parts to be connected to be practically as high as desired, while the mechanical strength of the members may also be great, since they engage from outside over the parts to be joined, that is to say are not subjected to any restriction in respect of their dimensions.

The edge strips of the parts to be joined over which the fastener members engage are advantageously constructed as rubber-elastic beads. As such they can either be connected to the parts by vulcanization or the like, or else directly formed thereon, or they may be formed by providing the flat edge strips with insertable reinforcements which then result in bead-like cross-sections. The edge beads can moreover be provided with stiffening inserts which ensure reliable transmission of the pressure created by the fastener members also to the areas situated between the individual members. In order to achieve adequate tightness and in addition also to compensate for tolerances in manufacture in respect of the edge strips or beads and the fastener members, it is advisable to select the dimensions so that the edge strips are elastically deformed by the fastener members brought into the closed position.

The elastic deformation of the edge strips by the fastener members when in the closed position can be utilized at the same time for the operation of the locking required for the clamp arms forming the fastener members, since the means provided for this purpose are so constructed that they can be connected and disconnected after one over-stroke of the clamp arms in the closing direction. These locking means are thus very simple, since they require no additional springs or the like for securing in the locked position and accordingly can be held by form-closure constraint, so that bending stresses and the like acting on the fastener also cannot lead to an unintentional opening of the connection made.

In addition, the elastic deformation of the edge strips or beads by the clamp arms when in the closed position can be used to shift the clamp arms into the open position after the locking has been freed, or to hold them in that position. It would however also be possible to provide separate devices for this purpose.

The fastener members themselves can be of various shapes, so that it is possible to use the fastener of the present invention for the most diverse purposes. Two structurally differing possibilities are obtained, for example, by the fact that the clamp arms forming a fastener member can be either non-detachably joined together or be separable. In the case of clamp arms which are non-detachably articulated together, each articulated connection may be formed by means of a pin extending laterally and formed on each clamp arm, said pin passing through an aperture in the other clamp arm. It would however also be possible to use separately produced pivot pins. With this type of fastener member, one clamp arm of each fastener member can be joined fast to one of the edge strips, while the members following one another in the longitudinal direction of the fastener can either all be situated on one edge strip or be situated alternately on the two edge strips. It is also possible to arrange fastener members of this type in rows in one or the other of the above forms on special carries which are independent of the parts to be connected and if desired may be detachably connectable thereto. For this purpose, for example, adhesives may be used.

The use of carriers which are independent of the parts to be connected, or which can be detachably connected thereto, has the advantage over fixed mounting of the fastener members on the parts to be connected that the fastener can easily be replaced. Such exchangeable carriers can be used in all cases independently of the shape of the fastener members. They can be constructed as bands, tubular sheaths, wires, helical springs, or the like, which carry the rows of fastener members. In many cases the carriers can be used at the same time also to promote the operation of the locking devices, for example by using their elastic deformability in order to shift the clamp arms into the open position after unlocking has taken place.

It is furthermore possible to secure clamp arms, each of which forms a fastener member, separately on the two edge strips to be joined and to equip them with coupling or locking means which come into engagement with one another only in the closed position. In such constructions, the use of separate carriers is also possible, so that the fasteners can be used in the desired manner or at least can easily be detached for the purpose of replacement.

Just as the construction and type of the clamp arms forming the fastener members can be modified in many ways, so also can the locking devices be of various types. A particularly simple construction allows for providing supporting surfaces on the clamp arms allocated to one another and forming fastener members, and providing said supporting surfaces with a locking member running over the length of the fastener in the form of a wire, spring band, or the like, said locking member being controlled by guides on the fastener slide in such manner that during the closing or opening displacement of the clamp arms effected by the slide, it is raised and on completion of the movement is brought back into engagement with the supporting surfaces allocated to the adjustment effected, for the purpose of locking. Such a locking means is simple and dependable in operation, but makes it necessary to provide the slide, as in ordinary fasteners, with one direction of movement for opening and one direction of movement for closing. This is not, however, necessary in the case of the fastener members used according to the present invention and adapted to rock transversely to the longitudinal direction of the fastener, since the fastener member can be controlled independently of the neighboring members, that is to say in principle they can be controlled with movement of the slide in any direction.

The locking device for the mutual supporting of the clamp arms forming the fastener members can moreover also be formed by supporting devices mounted on the clamp arms, for example, in the form of lateral pins forming supporting surfaces and of hooks cooperating therewith. It is then advisable to dispose the pins or the like forming the support surfaces between fork arms formed on the clamp arms, in order to ensure reliable engagement of the co-acting members.

Another possible form of construction of the locking device comprises connecting the clamp arms forming the fastener members non-detachably to one another by means of a coupling member which forms a part of the locking device. In this case it is advisable to connect the clamp arms pivotally and slidably to the coupling member, whereby the locking can be engaged or disengaged by the sliding in the region of the connection point. The coupling piece then advantageously bears against the edge strips which are elastically deformed in the closing position, so that the position of the fastener and the position at a given moment of its part members can be plainly controlled by force-closure constraint by the slide. In this case also the elasticity of the edge strips can be utilized for the restoration of the fastener after opening.

Bridges may for example be used as coupling members, these bridges having notch surfaces cooperating with supporting surfaces on the clamp arms. These bridges may also be mounted on a bearer running through the length of the fastener, which bearer holds the various members at the prescribed distance and makes it possible to keep the fastener independent of the parts to be connected, so that it can be used in the selected manner. Instead of such bridge-shaped coupling pieces, it is also possible for example to make use of a helical spring running throughout the length of the fastener, and which then not only couples the clamp arms in pairs but also holds the fastener members together in the longitudinal direction of the fastener, so that here again independent construction of the fastener is possible. In addition, the elasticity inherent in the turns of the helical spring holding the clamp arms can be used directly as an adjusting force for the locking device or for the restoration of the unlocked clamp arms. Finally, such a helical spring can be equipped with any desired winding cross-sections, so that a closing width of the members which can be selected at variable magnitudes can also be achieved in simple manner. The fastener members can be slidably mounted on opposite parts of the windings of the spring and so constructed that they are locked by force-closure constraint to the windings in the particular position adjusted. In order to obtain dependable securing of the arms in every case, particularly in the case of winding parts serving to guide the clamp arms and curved for the purpose of obtaining variable closing widths of the fastener members, it may be advisable to provide the areas of the spring windings acting as pressure surfaces with roughenings which ensure considerable independence of the co-efficients of friction occurring in each particular case.

Further possibilities of locking the clamp arms forming the fastener members are afforded, for example, by the use of rockable pawls, which may also be subordinate to the direct action of the elastic initial tension of the edge strips.

In order to be able to bring the clamp arms forming the fastener members conveniently into the opening and closing positions, use is made of a slide which applies the necessary adjusting forces thereto. Apart from the previously mentioned construction of such a slide for fasteners having a locking member running along its length in the form of a wire or the like, the slides can be very simple in construction, while the necessary control surfaces thereon for the opening and closing of the fastener can be applied to the members either by tipping the slide in different manners or by mechanically acting adjusting devices. The control surfaces of the slides allocated to the closing operation have only the task of guiding the clamp arms of the members in relation to one another in such manner that they are locked together after reaching the position corresponding to the closing position. For this purpose it is sufficient to have a sleeve open at one end having width dimensions widening conically at least towards one end, which sleeve is guided by form-closure constraint on the outer surfaces of the members. The surfaces allocated to the opening of the fastener can be simple because they have substantially the task of guiding together the clamp arms further over the clamp width corresponding to the closing position, accompanied by further elastic deformation of the edge strips, so that the form-closure constraint preferably provided for the locking is cancelled, and of providing yieldability in the upward direction so that the locking devices can move in that direction and hence free the movement of the clamp arms in the manner previously mentioned under the action of the elastic tension of the edge strips or of the initial tension of the fastener member carriers into the open position. Since the fastener members are independent of one another, it is then possible to open or close the fastener at any desired point. The control devices can also be so mounted on the slide that both the opening and the closing movement can be performed in any direction.

In addition, the slide can immediately be drawn off the fastener so that at the same time security of locking is possible. This can be particularly effective if the row of fastener members has a particular profile in cross-section with which the slide intended to operate this fastener coincides in respect of the shape of its internal cross-section, since the fastener can then be operated only with the particular slide allocated to it. The rocking of the fastener members or clamp arms transversely to the longitudinal direction of the fastener has in addition not only the advantage that the slide can be drawn off, but that, moreover, it permits tight connections of the entire length of the fastener, so that no additional covering devices are necessary for the portion of the row of fastener members located in the region of the slide.

In order further to simplify the operation of the fastener, the slide may be so constructed that it can be mounted on the fastener at any desired point. For this purpose the slide can be formed either from two half-bowls adapted to be joined together in a plane running parallel to the longitudinal axis of the fastener or from half-bowls movable about a rocking axis located there and adapted to be locked together in the operative position. Furthermore, it is also possible to construct the slide to be elastically resilient in itself and to bring it into and secure it in the operative position with the aid of mechanical control means. For this purpose, for example, a rotating bolt co-operating with supporting surfaces disposed on its back can be used. In addition, the slide can be constructed from a plurality of parts in such manner that for example a form-rigid slide sleeve is used to guide or control retaining members. The latter may then either be elastically deformable, i.e. for example may consist of a resilient clamp member slidable transversely to the longitudinal extent of the sleeve on inclined surfaces or of retaining members slidable parallel to the longitudinal extent of a sleeve which is conical in that direction and which has conically constructed retaining arms which for example are automatically brought into the operative position by the pulling member of the slide acting directly on them. This does not however in any way exhaust the possibilities for construction or removable slides.

Further features and advantages of the fastener of the present invention will be apparent from the following description taken in conjunction with the accompanying drawings, which illustrate diagrammatically and by way of example, several embodiments thereof, and in which:

Figs. 1 and 2 show the clamp arms of a fastener member in side elevation;

Fig. 3 is a section along the line III—III of Figure 1;

Fig. 4 is a cross section of the closed fastener;

Fig. 5 is a corresponding view of the open fastener;

Figs. 6 to 8 show the fastener slide, in side elevation, front elevation, and plan view respectively;

Fig. 9 is a perspective view of a further construction of the fastener;

Fig. 10 shows the fastener of Figure 9 in the closed position;

Fig. 11 is a perspective view of a further embodiment of fastener;

Fig. 12 shows the fastener of Figure 11 in the open position;

Fig. 13 shows the fastener of Figure 11 in the closed position;

Fig. 14 is an exploded perspective view of a fastener member of a further embodiment;

Fig. 19 shows a cross-section of a still further construction of fastener, in the open position;

Fig. 19a is a fragmentary top view of the fastener of Fig. 19;

Fig. 20 is a cross-section of a modification of the fastener of Figure 19, in the closed position;

Fig. 21 is a perspective view of an end of a fastener row;

Fig. 22 is a view of a slide from below;

Fig. 23 is a perspective view of a slide consisting of a sleeve which is resilient in itself;

Fig. 24 is a section through the slide of Figure 23, in the open position;

Fig. 25 is a section through the same in the operative position;

Fig. 26 is a perspective view of a further embodiment of removable slide;

Fig. 27 is a section through the open slide of Figure 26;

Fig. 28 is a section through the closed slide of Figure 26;

Figure 29 is a further embodiment of removable slide, in perspective view;

Fig. 30 is a view of the underside of the slide of Figure 29;

Figs. 30a and 30b illustrate different operating positions of the slide of Fig. 30;

Fig. 30c is a transverse sectional view of the slide of Fig. 30a along line 30c—30c;

Fig. 31 is a holding member of the slide according to Figure 29, in perspective; and Fig. 32 is a further slide construction, in end elevation.

Figure 15:
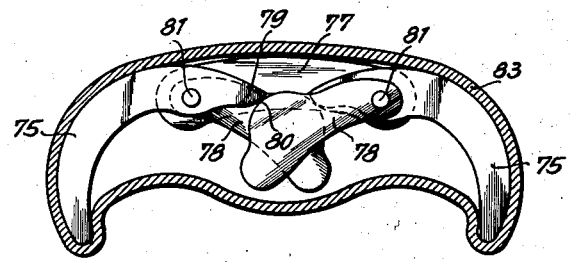
Fig. 15 shows, in the open position, a fastener having the fastener members shown in Figure 14.

The fastener members of the fastener construction according to Figures 1–8 of the drawings consist essentially of clamp arms 25 and 26, which are arcuately curved, and consist of metal or synthetic material. At its foot the arm 25 has a supporting limb 27, the outer surfaces of which are roughened so that an especially secure grip in one of the parts to be connected is obtained. If this part consists of a rubber-like material, the securing can be by vulcanizing. The arm 25 carries on its head part a laterally projecting pivot pin 28, which is produced in the present embodiment by means of non-cutting shaping, as shown in Figure 3. In the upper edge of the arm 25 a transversely directed notch 29 is arranged. The arm 26 has on its head part an opening 30, the dimensions of which conform to those of the pivot pin 28, with which opening it is turnably guided upon the pivot pin 28. Two notches 31 and 32, which can be brought into lines with the notch 29 according to choice, are provided for cooperation with the latter. The clamp arms 25 and 26 are provided on their outer faces with projecting cams 33 and 34.

The edge or sealing strips of the parts 35 and 36 to be connected are formed on the one hand with a flap or flange 37 carrying the embedded clamp arms 25, and on the other hand by a bead 38. A continuous wire 39 disposed in the longitudinal direction of the fastener serves as locking member for the end positions of the clamp arms articulated to one another. This wire is received between guides 40, 41 in the upper part of a sleeve-shaped slide 42 open at one side, the lower edge portions of which have grooves 43 and 44, which are intended for the reception of the cams 33 and 34. The part of the slide 42 carrying the groove 44 is curved upwards and outwards so that the arm 26 is controlled in the desired manner on longitudinal movement of the slide.

The fastener members consisting of the inter-articulated clamp arms 25 and 26 are secured in a uniform sequence to the edge strip 37. If the parts to be connected cohere before and behind the opening to be closed by means of the fastening, the edge parts 37 and 39 are led close together here, and are provided with blind fastener members, having substantially only the task of receiving the slide disposed in one or the other end position. In order to close the open fastener, the slide sliding on the cams 33 and 34 is moved in the closing direction. For the slide illustrated in Figure 6 the closing movement would be directed to the right. In this movement the arm 26 is first pivoted by the part 45 of the guide groove 44 further in the direction of opening, so that the wire 39 guided between the guides 41, 40 can be lifted out of the grooves 29, 32, which are in line. For this purpose the elastic initial tension of the upper edge part 46 of the edge strip 37 must be overcome, this tension seeking to pivot a projecting part 47 of the retaining arm 26 in the direction of maintenance of the open position ensured by the wire lying in the grooves 29 and 32. When the wire 39 has been lifted out, being guided between the guides 40—40 outside the clamp arms, the groove 44 of the slide 42 pivots the arm 26 downwards, so that it grips around the bead 38, and presses firmly against the edge strip 37. The pressure occurring in practice is then exceeded by means of an inwardly directed part 48 of the groove 44, so that the wire 39 can now shift easily into the notches 29, 31, which are now in line. Shortly before the end of the slide, the groove 44 permits a limited return movement of the retaining arm 26, so that the wire 39 is now clamped fast in the notches 29, 31. By means of projections provided upon the outer edge parts of the grooves 29, 31 and 32, form-closure constraint can be achieved, so that the locking of the arms 25 and 26 in the closed position is securely maintained. When the fastener is opened the slide 42 is moved in the opposite direction. Thus it first further closes the retaining arms so that the wire 39 can easily be lifted out, and then it gradually guides the arm 26 over into the open position, in which, upon a slight excess stroke against the elasticity of the edge 46, the wire can be laid into the notches 29, 32 associated with the open position.

In the embodiment illustrated the fastener connects edge or sealing strips with unequal cross-sections. It would also be readily possible, however, to have the cross sections of the two edge strips of similar shape. It would also be possible for continuous pivots throughout the length of the fastener, in the form of the wires 39 or the like, to serve for the articulated connection of the retaining arms forming one fastener member. Moreover, the locking means can be at such a distance from the axis of the articulated connection of the fastener members that the surface pressures occurring are kept within tolerable limits according to the material used in each case for the retaining arms.

The embodiment illustrated in Figures 9 and 10 employs clamp arms 50 similar to one another or the mirror-image of one another, which are connected to one another by a wire worm 51 with approximately rectangular cross section. The curved clamp arms 50 have at their points of connection laterally directed cams 52, with which they rest pivotably against the inner side of the parts of the turns of the wire worm 51 associated with them. Above the cams 52, projections 53, for example bent-out lugs in the case of metallic retaining arms, are formed on the arms 50. As is illustrated for example in Figure 9, the arms 50 can have grooves on their inner, lower ends, in which a rubber strip 54 or the like is received. In this embodiment the edge strips to be pressed against one another by the fastener are formed as elastic rubber beads 55 similar to one another. It would in this case also be possible, however, to make these cross-sections different. For example, one edge strip could have a rib-like projection extending over the entire length of the fastener, and the other part could have a groove corresponding thereto, which would not only be able to act in opposition to displacing forces, but might on occasion also be able to improve tightness.

In the open position, the arms 50 are positioned so high on the parts of the turns of the wire worm 51 guiding them that their projections 53 do not find counter-abutment, so that the arms can pivot outwards. This position can be maintained by the stiffness of the strip 54. In order to close the fastener, that is to say to press the beads 55 closely together, the fastener, which is independent over its entire length of the parts to be connected, and the members of which are held together by the wire worm 51, is placed upon the beads 55. By actuating a slide 56, which extends about the retaining arms from the external sides, and the inner width of which reduces conically from the entry, the arms are pivoted in opposite directions to effect closing. Furthermore, parallel with this movement there is also a displacement of the arms 50 downwards, as soon as the pivotal movement has progressed so far that the projections 53 are no longer hindered by the upper winding parts of the wire worm 51. Here again the distance necessary for the closing of the arms 50 is exceeded by a small amount. Now, in the further movement of the slide, due to a widened portion in relation to its internal width, the projections 53 come to bear upon the outer faces of the turns of the wire worm. However, due to upper support of the arms 50 by means of the slide, their position with relation to the wire worm 51 is maintained. The retaining arms here fasten themselves fast to the wire worm 50, so that the members over which the slide has run remain in the closed position. It may be advisable to roughen especially the parts of the turns of the wire worm intended to co-operate with the projections 53, in order to obtain, to a large extent, independence of changing coefficients of friction. If the parts of the turns of the wire worm associated with the projections 53 are made in a curved form, it is possible by selection of the path of downward displacement of the rotating arms, to adjust for varying widths of closure. For this purpose it would be possible to use slides usable according to choice, having control faces disposed at various levels, or slides with adjustable control faces. The rubber strip 54 not only serves to return the retaining arms into the open position and to secure the fastening members independent of the parts to be connected, but can also increase the tightness of the fastener.

In the embodiment illustrated in Figures 11 to 13, clamp arms 60 substantially forming the fastener members are connected in pairs by respective bridge portions 61. The connection is effected by means of pivot pins 62, which extend through slots in the counter elements. The connecting ends 63 of the arms 60 are bent laterally at right-angles, and provided at the top with short shanks 64 directed at an angle to their broad sides, the outer end faces 641 of which shanks form stops which are capable of cooperating with catch faces 611 formed on the bridges 61. Furthermore the bridge portions 61 are provided on their lower narrow sides with T-shaped openings 65 extending in the longitudinal direction of the fastener, with the aid of which they are mounted upon support elements 66 extending continuously in the longitudinal direction of the fastener and capable of change of shape. Figure 11 of the drawing further shows cut-away portions 67 arranged on the inside of the lower ends of the arms 60, which receive a rubber strip 68 or the like, which serves for an additional sealing off of the fastener, for returning the released arms 60, and for the mutual supporting of the fastener members forming the fastener independent of the parts to be connected. In Figure 12 such a covering is illustrated, while Figure 13 shows a variant in that here, in place of a rubber strip 68, a tube-like envelope 681 is provided for the row of fastener members, which protects the fastener from the exterior also against the penetration of foreign bodies, dirt and the like. The parts 69 and 70 to be connected are provided in this embodiment also with edge beads 71 and 72, having equal cross-sections, but which can also be dissimilarly formed. Furthermore a flap 73 overlapping the part 69 is formed upon the part 70, the forward edge of which flap could also be bevelled in order that when a positive pressure obtains upon the under-side, an additional sealing may be obtained by means of a packing effect.

When the clamp arms 60 are in the open position shown in Figure 12, the catch faces 611 lie in the connection regions of the arms above the end faces 641 of the shanks 64, so that locking does not occur. When the fastener has been placed upon the edge beads 71 and 72 to be connected, the arms 60 are pivoted in a direction towards each other by means of a slide (not shown), which may correspond to that shown in Figure 9, these arms then clamp the edge beads 71 and 72 between them. As soon as the pivotal movement has progressed sufficiently to permit engagement, a downwardly directed pressure is exerted by the slide upon the arms 60, which displaces them downwards with relation to the bridge portions 61. The bridge portions 61 cannot follow this movement, since their lower narrow edges are supported upon the edge beads 71 and 72. The slide now permits the arms 60 to move back a certain amount, without thereby removing their upper support. Thus the arms engage securely with the bridge portions, so that they are locked in the closed position. Unintentional breaking of the connection effected is not possible, since the parts are kept in engagement by the elastic initial tension of the edge beads 71 and 72, and since due to the extra movement in the closing direction, the locking arrangements can interengage with form-closure constraint. When the fastener is opened, first the arms 60 are brought nearer to one another by the slide, against the elastic initial tension of the edge beads 71 and 72, so that the locking is released. Since here no supporting of the arms in the upward direction is provided, they slide upwards with relation to the bridge portion 61. They can therefore pivot outwards into the opening position without hindrance by the engagement arrangement.

A similar manner of operation is provided in the embodiment shown in Figures 14 and 15. The fastener members here again have two clamp arms 75, which are arranged pivotally upon pivot pins 76 of a bridge portion 77. Also locking pieces 78 are pivotally mounted upon the pivot pins 76, each of which pieces 78 cooperates with the arm 75 placed opposite it. These arms 75 have catch faces 79, with which support faces 80 of the locking pieces 78 engages in the closed position. In this embodiment the succeeding fastener members, which can be formed as self-contained units by bridge portions 82 mounted on journals 81 of the pivot pins 76 and riveted, are contained in an elastic tubular envelope 83, and are held with the required spacing from one another by this envelope. The edge parts to be connected with the fastener are not shown in the drawing, and can again be formed as elastic rubber edge beads.

The manner of operation of this fastener construction conforms substantially to that of the embodiment shown in Figures 11 to 13. The arms 75 are pivoted by a slide in opposite directions, in the closing direction, and are pressed downward, the locking pieces 78 bearing upon the edge beads, and effecting a locking through the faces 79 and 80 after the closed position has been reached. In order to open the fastener, without upper support, the arms 75 are first brought so close to one another that the locking is removed. The arms 75 then return into the open position, for example under the action of the elastic initial tension of the envelope 83, the free supporting arms of the locking pieces 78 being able to yield downwards.

Figure 16:
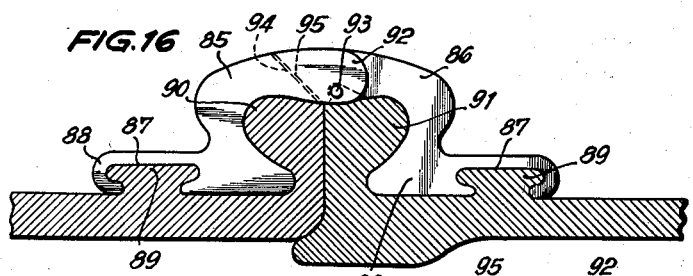
Fig. 16 is a still further construction of fastener in cross-section.
Figure 17:
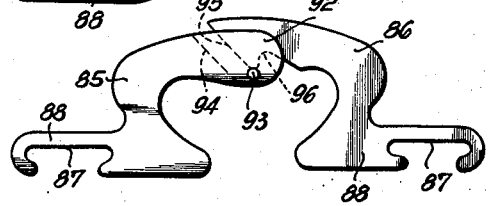
Fig. 17 is an elevation of the disengageable fastener members of the fastener according to Figure 16.
Figure 18:
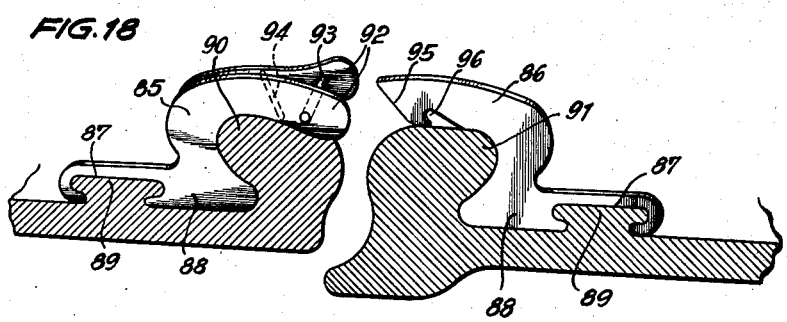
Fig. 18 is a perspective view of the same members.

In the embodiment shown in Figures 16 to 18, the clamp arms 85 and 86 forming the fastener members are independent of one another in the open position of the fastener. They are fitted or clamped by means of dovetail-shaped recesses 87 in their foot portions 88 on to ribs 89 corresponding in cross-section to the recesses 87, extending continuously along both sides of the seam to be fastened. They could further be vulcanized in, or in the case of the use of synthetic materials, they could be moulded or stuck in. The arms 85, 86 here extend over the edge beads 90 and 91 formed upon the parts to be connected. In the region of the point of coupling the arm 85 is forked at 92. Between the prongs of the fork 92 there is a pin 93, while the base of the fork is formed by an inclined face 94. The arm 86 on the other side of the fastener has, at the head, an inclined face 95, and is provided with a groove 96.

In the open position the arms 85 and 86 are completely independent of one another. In order to close the fastener, the retaining arms are brought near to one another by means of a slide (not shown) so that the head parts of the arms 86 engage in the forked ends of the arms 85. The arms are then supported also by the slide from above, so that they move into the locking position, in which the inclined faces 95 bear against the faces 94, and the notches 96 engage over the pins 93. By means of this double support the locking of the arms 85, 86 is effected, and is maintained by the elastic initial tension of the clamped-in elastic rubber beads. In order to open the fastener, the arms 85 and 86 are first moved towards one another in the closing direction, the points of action of the forces and the direction of the forces being capable of being made such that a tipping of the members takes place, which brings the coupling means out of engagement. Thus the fastener is opened. The arms, each pair of which forms a fastener member can be distributed alternately on the two edge strips, so that in all a symmetrical arrangement of the differently formed retaining arms is achieved.

The embodiment illustrated in Figures 19 to 22 also uses retaining arms which are independent of one another in the open position, and accordingly are mounted on the two parts to be connected. In the construction shown in Figures 19 and 19a, clamp arms 100 are clamped, fitted or otherwise connected by their foot parts upon ribs 101 of the parts to be connected, which extend continuously in the longitudinal direction of the fastener, like the edge beads 102. Integral portions of both beads 102 in Fig. 19 project transversely between longitudinally adjacent clamp arms 100 to support cover portions 1021 which in the closed positions of the device largely conceal and protect the clamp arms 100. The latter may further engage into the edge beads, or, as shown especially in Figure 20, can be clamped thereto by means of points 1001 formed thereon. In the region of its head part each of the arms 100, as best seen in Fig. 19a, all of which are alike, may be provided with a support pin 103 extending to one side, and a hook-shaped head 104. The support pins 103, lying on each side of the fastener in the same direction, do not only form catch faces for the hook parts 104 of the counter-members, but can simultaneously serve as distance pieces, which keep adjacent members in the correct spacing. It is here advisable to provide small recesses in the members beneath the foot of the support pins 103, into which recesses the heads of the support pins 103 of the adjacent members are laid.

A slide according to Figure 22 serves for the operation of this fastener and consists substantially of a sleeve 105 open along one longitudinal side, expanded conically on at least one side, and connected to a flap 107 for pulling by a loop 106. The inner cross-section of the sleeve 105 is made such that the latter can easily be moved upon the closed fastener. In order to secure the fastener against unauthorized opening, the row of fastener members can be provided at its ends with blind elements 108, having a profile provided with projections with which profile the cross-section of the slide, which is adapted thereto, conforms, as shown in Figure 21.

In the closing of the fastener the arms 100 are moved towards one another by the inner lateral faces of the sleeve-shaped slide 105, so that they hook into one another due to each hook part 104 hooking over a support pin 103 of the opposite row of retaining arms. Here again the position of the points of action of the forces, and the direction of the operating forces is made such that the engagement of the locking parts is guaranteed. In the opening of the fastener a movement of the retaining arms in the closing direction is first caused, which disengages the locking arrangement, but also permits pivoting thereof, which pivoting is supported by the elastic initial tension of the clamped in edge strips, and brings the arms into a position in which the locking means cannot come into mutual engagement again. This can be achieved, for example, either by exerting a downwardly directed pressure upon the foot parts of the arms 100, or by the operative pressure acting in the opening movement at a lower point of the members than in the closing of the fastener. Such displacement of the forces can be effected in the slide by forming the slide to be tiltable about a transverse axis.

In fasteners of the type according to the invention, with locking arrangement directly associated with the individual members, and independent of the adjacent members, it is possible to open or close the fastener at any desired point in its length. This can be effected in a simple manner by the selection of the position of the slide used in each case, which position can be varied by digital pressure in the operation of the slide. Furthermore the slides can be taken away from the fastener, which can be utilized as security against unauthorised opening. In order to achieve an even greater convenience in the operation, especially in the case of very long fasteners, it is advisable to make the slides removable.

A removable slide is shown in Figures 23 to 25 and consists essentially of a sleeve 110 open on one longitudinal side, consisting of hard spring material such as sheet steel, provided with an inwardly-bent portion 111 of U-shaped cross-section on the side opposite the continuous opening. In the bottom thereof a swivel bolt 112 is turnably held, and the handle 113 serving for the operation of the slide is mounted thereon. In the position without tension, shown in Figure 24 and corresponding to the open position, the swivel bolt lies with its wider sides parallel to the longitudinal extension of the bent-in portion 111. In this position the lower edges of the untensioned slide sleeve 110 are so remote from one another that it can be pushed on to the fastener at any desired position. If the swivel bolt is now turned with its wider sides transverse to the longitudinal extension of the inwardly-bent portion 111, its narrow sides co-operate with the side faces of the inwardly-bent portion 111 to effect an expansion of this part, which leads to a reduction in the internal width of the longitudinal continuous opening, and thus fixes the slide upon the fastener due to its shape. In order to secure this operative position, it is possible of course for catch notches or the like to be provided in the lateral faces of the inwardly-bent portion 111.

In the embodiment illustrated in Figures 26 to 28 the slide consists essentially of a rigid sleeve 115 open upon one longitudinal side, which guides, transversely to its longitudinal extension, a spring member 116 of approximately V-shaped cross-section, to which the handle 117 for the operation of the slide is attached. The legs thereof have, at the ends, bent-out portions which provide engagement with the edge parts of the slide 115 guiding them.

If a pressure is exerted upon the head part of the V-shaped spring member, the latter pushes downwards and the width of its opening increases. The slide can now be placed upon the fastener. By means of a pull upon the handle 117 the spring member pushes upwards now with relation to the sleeve 115, its width of opening reducing so that the spring member grips under the fastener with its hook-shaped arms lying on the lower ends, and thus renders the slide ready for operation.

The embodiment according to Figures 29 to 31 also uses a rigid slide sleeve 120, open at one side as best seen in Fig. 30c. Two clamping pieces 121 are movable in the sleeve 120 which widens towards its two open ends. A member 123 passing through slots in the lateral portions 221 of sleeve 120 is connected to each clamping piece 121 for moving the same. The clamping pieces 121 have inwardly projecting cam portions 121a which have cam nodes corresponding to the shape of the outer sleeve 120. In the position shown in Fig. 30a, the nodes of the cam pieces 121a are located in the wider end portions of the sleeve 120 so that between the two cam portions 120a a space having the width a is open. The distance a is greater than the outer width of the fasteners as for example shown in Fig. 20 so that the slider can be slipped over the fasteners at any point of the slide fasteners. However, if the cam pieces 121 are shifted to the position of Fig. 30b, or to the position of Fig. 30, the space between the clamping portions 121a is reduced to the distance b, since the cam nodes are located in the region of the constricted center portion of the sleeve 120. Therefore, the slider is operative to act in the recesses A of the fastener members 100 to produce the closing or opening of the slide fastener. In the position of Fig. 30 the slider is operated in one direction along a row of fasteners, whereas in the position of Fig. 30b the slider is operated in the opposite direction. In any event, it is possible to attach the slider at any point of the slide fastener, and to open such particular section of the slide fastener which is not possible in the arrangements of the known art.

The removable slide shown finally in Figure 32 consists essentially of two half shells 125, which are pivotable about an axis lying parallel to the length of the slide, and forming inter-engaging double levers acting in the manner of scissors. Their arms 127 have openings through which a ring 128 extends, upon which ring the handle of the slide is mounted. If no pull is exerted upon the ring 128, the parts 125 can be spread apart so far that they can be placed upon the fastener. If now the handle or the ring carrying it is charged with a pull, the parts 125 close like scissors. The fastener is thus ready for operation.

As already mentioned, the embodiments illustrated are only examples of the practical application of the invention, and the latter is not limited thereto. On the contrary, many other constructions are possible. Especially as regards the selection of the materials for the edge strips of the parts to be connected, and the individual parts of the fastener members, many variations can be made. Moreover, the form and manner of the fixing in of the fastener members can differ from the examples shown. It is possible, furthermore, to make the division of the rows of fastener members different from the illustrations, in that in each case a plurality of clamp arms lying one behind the other in the longitudinal direction of the fastener are rigidly combined to form one fastener member or part of a fastener member. It is thus possible under certain circumstances to obtain, with more simple means, a high degree of accuracy of division.

We claim:

1. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being movable relative to each other in a direction transverse to said direction toward and away from each other independently of the adjacent pairs of clamp arms from a releasing position in which said sealing strips are free to separate, through a clamping position in which the clamp arms of each pair form a bow embracing said longitudinal bead and in which associated pairs of sections of said sealing faces engage each other, and to a locking position in which said sections are resiliently compressed; and locking means for independently locking the clamp arms of each pair in said clamping position, said locking means interlocking in said locking position of each pair of said clamp arms and locking the clamp arms of each pair in said clamping position, each pair of said clamp arms being adapted to be moved to said locking position by a slider and to be moved to said clamping position by the resilient pressure of said sealing strips independently of the other pairs of clamp arms whereby any selected associated pair of sections of said sealing faces can be opened and closed.

2. In a slide fastener as claimed in claim 1, said locking means including pins pivotally supporting said clamp arms, and a locking member pivoted on said pins and cooperating with said clamp arms for locking the same in said clamping position.

3. In a slide fastener as claimed in claim 1, a coupling member connecting said clamp arms.

4. In a slide fastener as claimed in claim 3, locking portions on said coupling members constituting at least part of said locking means.

5. In a slide fastener as claimed in claim 4, said coupling member being formed with two slots, and including pins supporting said clamp arms in said slots pivotable and shiftable between said releasing and locking positions.

6. In a slide fastener as claimed in claim 1, a coupling member; a pair of pins secured to said coupling member; a pair of clamp arms and a pair of locking members pivotally mounted on said pins, each clamp arm being located opposite and cooperating with one of said locking members, said clamp arms being pivotable between a releasing position in which said clamp arms are adapted to permit separation of edge strips of the parts to be connected and a clamping position in which said clamp arms form a clamping bow adapted to grip and hold together the edge strip, said locking members being adapted to be pivoted by the resilient pressure of said edge strips into a position locking the clamp arms associated therewith in said locking position.

7. In a slide fastener as claimed in claim 1 wherein said clamp arms have projections on the outer faces thereof adapted to be engaged by a slide for being moved into said locking position.

8. In a slide fastener as claimed in claim 1, including means rigidly connecting said clamp arms and extending longitudinally of the slide fastener.

9. A slide fastener arrangement as claimed in claim 1 and including a slider embracing said clamp arms and being rockable about a transverse axis, said slider including cam means effecting movement of said clamp arms to said releasing position in one rocked position of said slider, and holding said clamp arms in said clamping position in another rocked position of said slider.

10. A slide fastener arrangement as claimed in claim 9 wherein said cam means are adjustable.

11. A slide fastener arrangement as claimed in claim 1, said slider including two semi-tubular members; means pivotally connecting said semi-tubular members; and means for locking said semi-tubular members in an operative position for shifting said clamp arms between said releasing and clamping positions.

12. A slide fastener arrangement as claimed in claim 1 wherein said slider consists of a resilient material, and including adjusting means for adjusting the cross-sectional width of said slider for detaching the same.

13. A slide fastener arrangement as claimed in claim 12 wherein said adjusting means include a turnable member turnable between a position engaging and spreading said slider for detachment and another position releasing said slider for returning resiliently to its normal position.

14. A slide fastener as claimed in claim 1 and including a slider for consecutively moving in said transverse direction the clamp arms of each pair of clamp arms from said releasing position and from said clamping position, respectively, to said locking position, said slider including a rigid sleeve shaped part open at one side and being formed with an opening on the other side and a V-shaped gripping member having two legs embracing said clamp arms and an apex portion passing through said opening; and a manually operated member attached to said apex portion so that the legs of said V-shaped member when pulled into said opening are compressed for moving said clamp arms to said clamping position.

15. A slide fastener as claimed in claim 1 and comprising a slider including a sleeve-shaped guiding member for consecutively moving in said transverse direction the clamp arms of each pair of clamp arms from said releasing position and from said clamping position, respectively, to said locking position, said sleeve-shaped guiding member having a portion of reduced cross-section in the center thereof and widened portions at the ends thereof; a pair of clamping members mounted in said guiding member slidable in longitudinal direction of the same, said clamping members having depressed inner surface portions at the centers thereof and inwardly projecting cam portions at the end thereof; and manually operated means for shifting said clamping members in said guiding sleeve between a central position in which said depressed surface portions are located in said portion of reduced cross-section of said sleeve-shaped guiding member and to two outer positions in which said one of said cam portions is located on said portion of reduced cross-section of said guiding member, said clamping members embracing said clamp arms, and releasing the same for detaching of said slider in said central position of said clamping members, and locking said clamp arms in said two outer positions.

16. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being respectively secured to one of said sealing strips and being movable relative to each other in a direction transverse to said direction toward and away from each other independently of the adjacent pairs of clamp arms from a releasing position in which said sealing strips are free to separate, through a clamping position in which the clamp arms of each pair form a bow embracing said longitudinal bead and in which associated pairs of sections of said sealing faces engage each other, and to a locking position in which said sections are resiliently compressed, each of said clamp arms being formed with a hooked projection, and including a pin laterally projecting in longitudinal direction, the pins of the clamp arms of each pair of clamp arms projecting in opposite longitudinal directions, the clamp arms of each pair of clamp arms being staggered in said longitudinal direction, the pin of each clamp arm engaging the hooked projection of the associated clamp arm in said locking and clamping positions, said pins and hooked projections interlocking in said locking position, each pair of clamp arms being adapted to be moved to said locking position by a slider and to be moved to said clamping position by the resilient pressure of said sealing strips independently of the other pairs of clamp arms whereby any selected associated pair of sections of said sealing faces can be opened and closed.

17. A slide fastener as claimed in claim 16 and comprising a slider including a sleeve-shaped guiding member for consecutively moving in said transverse direction the clamp arms of each pair of clamp arms from said releasing position and from said clamping position, respectively, to said locking position, said sleeve-shaped guiding member having a portion of reduced cross-section in the center thereof and widened portions at the ends thereof; a pair of clamping members mounted in said guiding member slidable in longitudinal direction of the same, said clamping members having depressed inner surface portions at the centers thereof and inwardly projecting cam portions at the end thereof; and manually operated means for shifting said clamping members in said guiding sleeve between a central position in which said depressed surface portions are located in said portion of reduced cross-section of said sleeve-shaped guiding member and two outer positions in which said one of said cam portions is located on said portion of reduced cross-section of said guiding member, said clamping members embracing said clamp arms, and releasing the same for detaching of said slider in said central position of said clamping members, and locking said clamp arms in said two outer positions.

18. A slide fastener as set forth in claim 16 wherein each of said clamp arms has an outwardly located recess adapted to be engaged by a slider for moving said clamp arms from said clamping position to said locking position, said bead being located intermediate said recesses and said hooked projections and pins.

19. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being respectively secured to one of said sealing strips and being movable relative to each other in a direction transverse to said direction toward and away from each other independently of the adjacent pairs of clamp arms from a releasing position in which said sealing strips are free to separate, through a clamping position in which the clamp arms of each pair form a bow embracing said longitudinal bead and in which associated pairs of sections of said sealing faces engage each other, and to a locking position in which said sections are resiliently compressed; and locking means for independently locking the clamp arms of each pair in said clamping position, said locking means interlocking in said locking position of each pair of said clamp arms and locking the clamp arms of each pair in said clamping position, each pair of said clamp arms being adapted to be moved to said locking position by a slider and to be moved to said clamping position by the resilient pressure of said sealing strips independently of the other pairs of clamp arms whereby any selected associated pair of sections of said sealing faces can be opened and closed.

20. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being movable relative to each other in a direction transverse to said direction toward and away from each other independently of the adjacent pairs of clamp arms from a releasing position in which said sealing strips are free to separate, through a clamping position in which the clamp arms of each pair form a bow embracing said longitudinal bead and in which associated pairs of sections of said sealing faces engage each other, and to a locking position in which said sections are resiliently compressed, each of said clamp arms being formed with an outwardly facing recess adapted to be engaged by a slider for moving said clamp arms from said clamping position to said locking position, said recesses forming two rows of recesses, said rows of recesses being located on opposite sides of said bead; and locking means for independently locking the clamp arms of each pair in said clamping position, said locking means interlocking in said locking position of each pair of said clamp arms and locking the clamp arms of each pair in said clamping position, each pair of said clamp arms being adapted to be moved to said locking position by a slider and to be moved to said clamping position by the resilient pressure of said sealing strips independently of the other pairs of clamp arms whereby any selected associated pair of sections of said sealing faces can be opened and closed.

21. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being respectively secured to one of said sealing strips and being movable relative to each other in a direction transverse to said direction toward and away from each other independently of the adjacent pairs of clamp arms from a releasing position in which said sealing strips are free to separate, through a clamping position in which the clamp arms of each pair form a bow embracing said longitudinal bead and in which associated pairs of sections of said sealing faces engage each other, and to a locking position in which said sections are resiliently compressed, each of said clamp arms being formed with an outwardly facing recess adapted to be engaged by a slider for moving said clamp arms from said clamping position to said locking position, said recesses forming two rows of recesses, said rows of recesses being located on opposite sides of said bead; and locking means for independently locking the clamp arms of each pair in said clamping position, said locking means interlocking in said locking position of each pair of said clamp arms and locking the clamp arms of each pair in said clamping position, each pair of said clamp arms being adapted to be moved to said locking position by a slider and to be moved to said clamping position by the resilient pressure of said sealing strips independently of the other pairs of clamp arms whereby any selected associated pair of sections of said sealing faces can be opened and closed.

22. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being pivoted to each other movable relative to each other in a direction transverse to said direction toward and away from each other independently of the adjacent pairs of clamp arms from a releasing position in which said edge strips are free to separate, through a clamping position in which the clamp arms of each pair form a bow embracing said longitudinal bead and in which associated pairs of sections of said sealing faces engage each other, and to a locking position in which said sections are resiliently compressed; and an elongated locking wire adapted to extend longitudinally of said sealing strips, one clamp arm of each pair of said clamp arms being formed with one recess, and the other clamp arm being formed with two recesses, one of said two recesses registering with said one recess in said one clamp arm in said releasing position for receiving said locking wire, and the other of said two recesses registering with said one recess of said one clamp arm in said locking position of said clamp arms for receiving said locking wire, each pair of said clamp arms being adapted to be moved to said locking position by a slider and to be moved to said clamping position by the resilient pressure of said edge strips independently of the other pairs of clamp arms whereby any selected associated pair of sections of said sealing faces can be opened and closed.

23. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being pivotable and shiftable relative to each other in a direction transverse to said direction toward and away from each other independently of the adjacent pairs of clamp arms from a releasing position in which said edge strips are free to separate, through a clamping position in which the clamp arms of each pair form a bow embracing said longitudinal bead and in which associated pairs of sections of said sealing faces engage each other, and to a locking position in which said sections are resiliently compressed; and locking means for independently locking the clamp arms of each pair in said clamping position, said locking means being formed with shoulders engaging said clamp arms in said locking position and releasing said clamp arms when the same are shifted to permit pivoting of said clamp arm to said releasing position, each pair of said clamp arms being adapted to be moved to said locking position by a slider and to be moved to said clamping position by the resilient pressure of said edge strips independently of the other pairs of clamp arms whereby any selected associated pair of sections of said sealing faces can be opened and closed.

24. In a slide fastener, a pair of elongated resilient sealing strips extending in a longitudinal direction, each of said sealing strips having a flange, said flanges having oppositely located inner sealing faces, said flanges being shaped to form a longitudinal bead when said inner sealing faces engage each other; a set of separate pairs of arcuate clamp arms forming a row extending in the direction of said bead, the clamp arms of each pair of clamp arms being pivoted to each other and being movable relative to each other in a direction transverse to said direction toward and away from each other independently of the adjacent pairs of clamp arms from a releasing position in which said edge strips are free to separate, through a clamping position in which the clamp arms of each pair form a bow embracing said longitudinal bead and in which associated pairs of sections of said sealing faces engage each other, and to a locking position in which said sections are resiliently compressed; and locking means for independently locking the clamp arms of each pair in said clamping position, said locking means interlocking in said locking position of each pair of said clamp arms and locking the clamp arms of each pair in said clamping position, each pair of said clamp arms being adapted to be moved to said locking position by a slider and to be moved to said clamping position by the resilient pressure of said edge strips independently of the other pairs of clamp arms whereby any selected associated pair of sections of said sealing faces can be opened and closed.

25. In a slide fastener as claimed in claim 24, a pin projecting from one of said clamp arms of each pair, the other of said clamp arms of each pair being formed with a bore receiving said pin for pivotally connecting said clamp arms to each other.

26. In a slide fastener as claimed in claim 24, means for fastening the end remote from said pivot point of one of said clamp arms of each pair to one of the edge strips of the parts to be connected.

References Cited in the file of this patent

UNITED STATES PATENTS

| | | |
|---|---|---|
| 504,038 | Judson | Aug. 29, 1893 |
| 1,680,919 | Walkup | Aug. 14, 1928 |
| 1,843,023 | Edmondson | Jan. 26, 1932 |
| 2,296,468 | Feist | Sept. 22, 1942 |
| 2,306,488 | Morner | Dec. 29, 1942 |
| 2,366,816 | Morner | Aug. 15, 1944 |
| 2,562,298 | Morner | Sept. 11, 1951 |
| 2,612,169 | Segal | Sept. 30, 1952 |
| 2,651,091 | Priestly | Sept. 8, 1953 |

FOREIGN PATENTS

| | | |
|---|---|---|
| 120,653 | Sweden | Nov. 20, 1947 |
| 806,364 | Germany | June 14, 1951 |
| 818,033 | Germany | Oct. 22, 1951 |
| 952,606 | France | Nov. 21, 1949 |